July 9, 1940.   J. J. JAKOSKY   2,207,060
METHOD AND APPARATUS FOR ELECTRICAL EXPLORATION OF THE SUBSURFACE
Filed Sept. 7, 1937   2 Sheets-Sheet 1
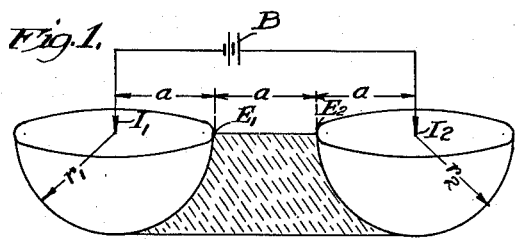
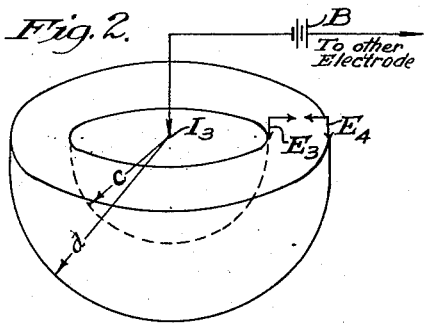
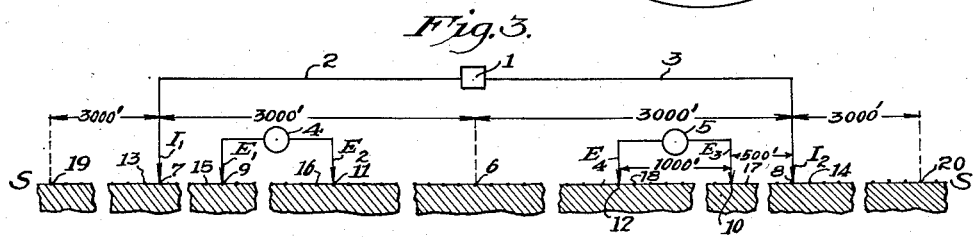
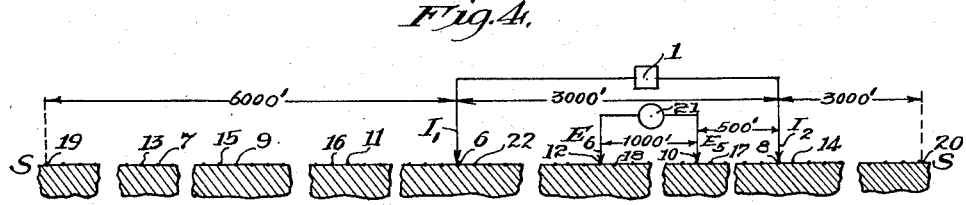
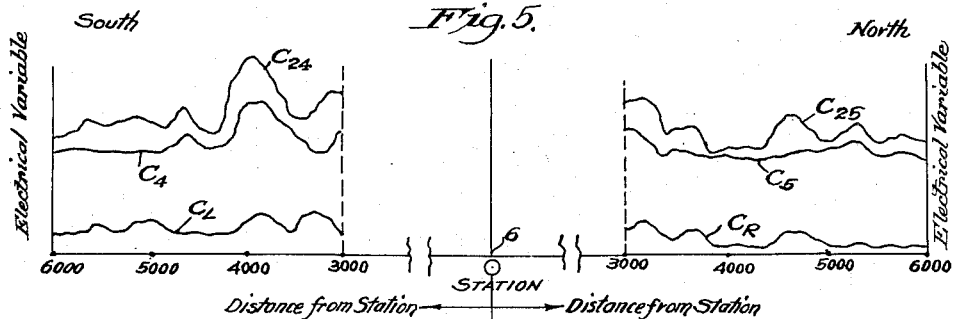
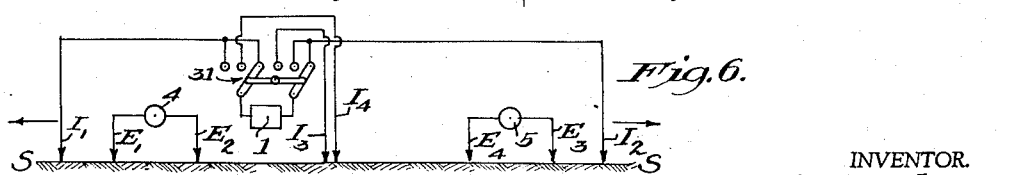
INVENTOR.
John Jay Jakosky,
BY
ATTORNEYS July 9, 1940.  J. J. JAKOSKY  2,207,060
METHOD AND APPARATUS FOR ELECTRICAL EXPLORATION OF THE SUBSURFACE
Filed Sept. 7, 1937  2 Sheets-Sheet 2
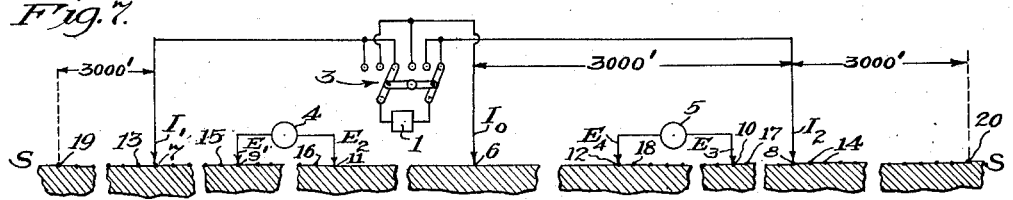
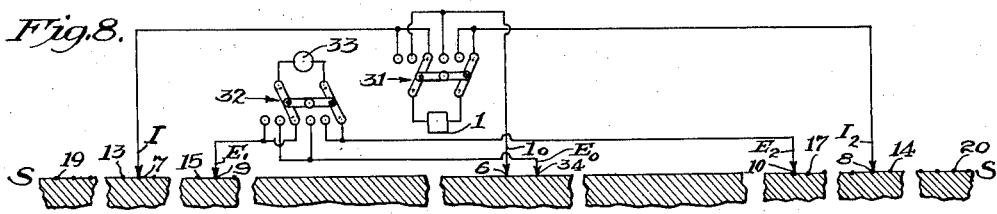
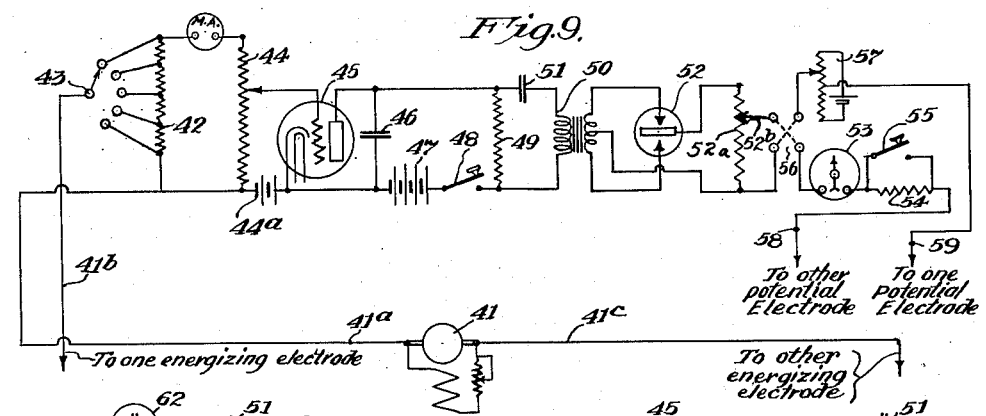
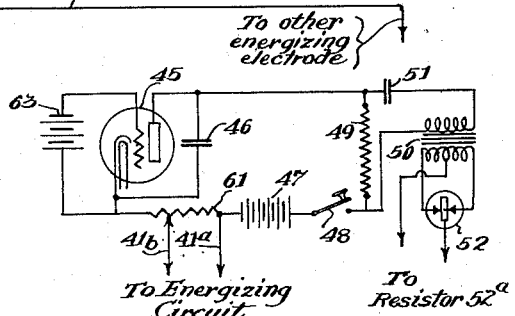
INVENTOR.
John Jay Jakosky,
BY
ATTORNEYS Patented July 9, 1940

2,207,060

UNITED STATES PATENT OFFICE 2,207,060

METHOD AND APPARATUS FOR ELECTRICAL EXPLORATION OF THE SUBSURFACE

John Jay Jakosky, Los Angeles, Calif.

Application September 7, 1937, Serial No. 162,635

18 Claims. (Cl. 175—182)

This invention relates to geophysical prospecting and pertains more particularly to an improved electrical method and apparatus for use in determining the geological nature and characteristics of the subsurface.

The principal object of the invention is to provide a method whereby surface effects, or effects due to near-surface inhomogeneities, are differentiated from the deeper structural effects, thereby producing greater accuracy and more definite interpretation of the resulting data.

A further object of the invention is to provide a method for the electrical exploration of the subsurface by which surveys may be conducted more rapidly and accurately than with previous methods.

Another object of the invention is to provide a field technique and system of measurements which is more rapid due to the simplification of field procedure, which decreases the surveying time and the number of stations which must be occupied.

Another object of the invention is to provide a method in which electrical measurements may be made along a single line or traverse, thus involving a minimum of property damage and allowing the work to be conducted along highways and roads where accessibility to the adjacent property cannot be obtained.

Another object of the invention is to provide an electrical method and apparatus for the exploration of the subsurface in which the potential electrodes are located adjacent an energizing electrode, so that advantage may be taken of the steeper part of the potential drop curve, where changes in the subsurface structure give the greatest measurable differences in potential or in the ratio of potential to energizing current.

Another object of the invention, in a preferred embodiment thereof, is to provide a method which is less subject to errors, inasmuch as all points at which electrodes are located are at exactly the same distance apart, thereby minimizing errors of reading and errors in initial survey of the stations.

Another important object of the invention, in one embodiment thereof, is to provide a field technique employing an electrode arrangement allowing a series of measurements to be made to determine near-surface inhomogeneities concurrently with a series of measurements to determine the structure at depth.

An important object of the invention, in its preferred form, is to provide a means for differentiating the near-surface and the deeper-lying effects while eliminating variations in electrical properties due to variations in current density in the near-surface and the deeper structural measurements.

An important object of this invention is to provide a means for obtaining the ratio of ground potential and energizing current in a single reading, irrespective of the magnitude of the current.

Another object of the invention is to provide an apparatus which provides for complete electrical isolation of the energizing and the measuring circuits while obtaining a measurement of the relation between the energizing current and the created ground potential.

I have illustrated in the accompanying figures of drawings several methods of conducting an electrical exploration of the subsurface, and forms of apparatus which would be useful therewith, and referring thereto:

Fig. 1 is illustrative of a common electrode arrangement which has been used to determine the resistivity of the subsurface;

Fig. 2 is illustrative of another electrode arrangement which has been employed in making resistivity measurements;

Fig. 3 is a diagrammatic representation of an electrode arrangement according to my invention which may be used for conducting a primary variable depth survey in a region;

Fig. 4 is a diagrammatic representation of an electrode arrangement which may be used to conduct a second or auxiliary survey over the region illustrated in Fig. 3, whereby near-surface inhomogeneities may be detected;

Fig. 5 shows the form of data which may be obtained after conducting a survey according to the procedure outlined in relation to Figs. 3 and 4;

Fig. 6 is a diagrammatic representation of an electrode arrangement which may be used for concurrently conducting the two surveys according to the procedures illustrated in Figs. 3 and 4;

Fig. 7 is a diagrammatic representation of a modified electrode arrangement which may be used for concurrently conducting two surveys, one of a greater depth than the other, while using the same electrode movements for each survey;

Fig. 8 shows another arrangement for conducting a survey somewhat similar to that shown in Fig. 7;

Fig. 9 is a wiring diagram of a useful form of apparatus according to my invention; and Figs. 10 and 11 illustrate modified forms thereof.

In the present methods of geophysical exploration the depth of penetration of the electric current into the subsurface is controlled by: (a) varying the distance between the electrodes, while maintaining a constant configuration or spacing ratio of the energizing electrodes and the potential electrodes, or (b) maintaining a constant fixed position with large separation of the energizing electrodes and varying the distance between the potential electrodes and the energizing electrodes. It has also been proposed to obtain measurements with a constant depth of penetration by maintaining a constant spacing between the electrodes, and moving the entire configuration forward over the surface of the earth. It has also been proposed to "partition" the ground between two energizing electrodes into halves or symmetrical portions and determine the angle of slope of the subsurface by comparing the potential readings obtained on one side of the imaginary partition with those obtained on the opposite side of the partition. When deeper exploration is attempted, the latter method is not practical due to the masking effect of surface and near-surface inhomogeneities which occur between the two halves on account of the great distance between the two energizing electrodes.

The prior art teaches that the depth of measurement is related to or a direct function of (a) the distance between the potential measuring electrodes, or (b) the distance between the potential electrodes and an energizing electrode. In those systems employing a constant ratio of spacing between the energizing and the potential electrodes, as illustrated in Fig. 1, it is assumed that the depth of measurement is effectively equal to the distance between the potential electrodes, and that the resistivity as measured is the resistivity between two hemispheres each having an energizing electrode as a center and each having a radius equal to the distance between an energizing electrode and an adjacent potential electrode. This relationship is diagrammatically illustrated in Fig. 1. In this figure $I_1$ and $I_2$ represent the energizing electrodes and $E_1$ and $E_2$ represent the potential electrodes. Power is passed into the ground between $I_1$ and $I_2$ by means of a power source or battery B. The imaginary hemispheres about the electrodes $I_1$ and $I_2$ have radii indicated at $r_1$ and $r_2$ respectively, which are equal to the distances between $I_1$ and $E_1$ and between $I_2$ and $E_2$. Usually the distances $I_1$—$E_1$, $E_1$—$E_2$, and $E_2$—$I_2$ are made equal, as designated at $a$. Under these conditions the resistivity may be expressed by the formula $$\rho = 2\pi a \frac{E}{I}$$

wherein E is the potential measured between $E_1$ and $E_2$, and I is the current flowing between $I_1$ and $I_2$. The depth of measurement is varied by varying the separation between $E_1$ and $E_2$, while maintaining a constant ratio of spacing for the entire electrode system.

An alternative method employs the exploration of the potential field around only one of the two energizing electrodes, as is shown in Fig. 2. For this purpose, one energizing electrode $I_3$ is placed over the position where it is proposed to determine the subsurface conditions, and the second energizing electrode is placed at a considerable distance away. Two potential electrodes $E_3$ and $E_4$, spaced from electrode $I_3$, are employed for determining the potential distribution around the electrode $I_3$. The positions of electrodes $E_3$ and $E_4$ determine the surface position of the potential hemispheres surrounding the energizing electrode $I_3$. The distance $I_3$—$E_3$ equals $c$, and the distance $I_3$—$E_4$ is equal to $d$, which constitute the radii of the respective equi-potential hemispheres. On the assumption that the current which enters at the energizing electrode $I_3$ must pass from one equi-potential hemisphere to the other, the resistivity may be calculated according to the following formula:

$$\rho = \frac{2\pi cd}{d-c} \cdot \frac{E}{I}$$

When the electrode $E_3$ is spaced equi-distant between the electrodes $I_3$ and $E_4$, then the formula may be simplified and reduced to the following equation:

$$\rho = 2\pi c \frac{E}{I}$$

In either of these methods vertical depth exploration may be obtained by varying the distance between the electrodes, which involves movement of the potential electrodes to different positions on the earth's surface. The results are usually plotted in the form of graphs showing the relationship between electrode separation and the calculated resistivity.

The nearer the electrical discontinuity lies to the surface of the ground the more pronounced and acute will be the flexures in the depth-electrical property curves obtained during a variable depth survey, and with experience a subsurface change of outstanding magnitude may sometimes be recognized in simple cases. On the other hand, however, there is greater difficulty in evaluating the importance and significance of a mild indication or change. Such a change may be due to a deep-seated electrical change of large extent or, equally well, to some inhomogeneity in the geological formations lying near the surface. It will be understood therefore that interpretation of such data is largely empirical in character. It is the chief purpose of the method and field procedure disclosed herein to properly evaluate and segregate the near-surface effects so that the deep structural effects may be positively identified, which results in great increases in the accuracy, reliability and value of the work.

The near-surface effects are not necessarily the electrical inhomogeneities existing directly adjacent the surface of the earth, caused by variations in moisture content, changes in salt content of the soil, superficial drainage features, topography, vegetation, shallow wash deposits, marsh zones, etc., but comprise also the somewhat deeper extending effects, some of which are associated with the zone of aeration, or the "weathered zone" commonly encountered in the application of the seismic method. The weathered zone is generally associated with the downward penetration of surface waters, and comprises a zone of irregular perimeter which varies in thickness from a few feet to hundreds of feet from place to place. The electrical character of the zone depends upon local soil conditions, topography and surface drainage features, variations in porosity of the upper earth layers, water-table elevations and distribution of underground waters, and many other effects. The variations in surface moisture and electrolyte content cause corresponding variations of major importance in the electrical conductivity of the near-surface layers.

Since the electrical effects are inversely proportional to some higher power of the distance below the surface, it can be seen that the near-surface variations cause predominant variations or changes in the electrical surface measurements. Even a small variation in the near-surface electrical properties will mask a relatively large variation occurring at greater depths. Especially is this true when attempting to apply the electrical method to structural mapping for oil work. In work of this type it is necessary that the measurements be carried to relatively great depths, for example, from 3,000 to 6,000 feet or more. When working to a depth of 5,000 feet, for example, the energizing electrodes are at a distance of approximately 15,000 to 20,000 feet apart. It will readily be appreciated that with this large separation of the electrodes, there is ample opportunity for many changes in the near-surface electrical properties of the earth. Furthermore, I have found that the near-surface variations are sufficient, when utilizing these large separations, to prevent even approximate correlation of the curves plotted from data obtained on each side of the center point, when using the so-called partition method. When it is considered that the sets of measurements obtained on each side of a center point cannot be correlated with the partition method, it becomes obvious that difficulty will also be encountered when attempting to correlate curves for stations placed at intervals of one or more miles apart, which is desirable for economical commercial operations.

When applying the electrical methods outlined in relation to Fig. 1, the near-surface variations occurring adjacent each of the two electrodes $I_1$ and $I_2$ are inadvertently averaged or treated as a single variation. Such being the case, the variations adjacent each electrode combine to form irregular and promiscuous variations which cannot be identified as belonging to either the subsurface conditions or the near-surface effects. When attempting to apply the method outlined in relation to Fig. 2, the near-surface variations influence the measurements obtained between potential electrodes $E_3$ and $E_4$ as these electrodes are moved over the surface of the earth. If now similar measurements are made adjacent the other energizing electrode, surface variations will again be recorded for the conditions existing near this other energizing electrode. Thus, while somewhat more complete data may be obtained by making potential measurements adjacent each of the two energizing electrodes, in preference to using the averaging system outlined in Fig. 1, each of the sets of measurements so obtained will generally be influenced to a large degree by near-surface variations.

The masking effects of near-surface variations are also experienced when measuring other variables than potential, such as phase shift.

Procedures in which measurements are made adjacent the two energizing electrodes are described in my copending applications Serial Nos. 144,467, 145,795, and 146,781 now respectively Patent Nos. 2,174,343, 2,167,950 and 2,137,650. As the spacing between energizing electrodes is varied, measurements of potential or other electrical variable may be made between points adjacent one or each of the energizing electrodes, and the distance between an energizing electrode and each of the adjacent measuring points is kept constant. I have found that by maintaining a relatively close separation of the potential points with respect to one another, and with respect to the nearest energizing electrode, the effects of ground currents and other disturbing factors are minimized and a greater accuracy of measurement may be obtained so that subsurface properties may be more positively and definitely ascertained. I have further found that when maintaining this relatively close separation of the measuring points, a somewhat greater variation in the measurement is introduced by the near-surface effects.

As pointed out in my copending application Serial No. 144,467, for "Method and apparatus for electrical exploration of the subsurface," filed May 24, 1937, I have found that the depth of penetration is controlled to a large extent by the separation between the energizing electrodes, and that the relationship or distance between the potential and energizing electrodes, or between the two potential electrodes, may be a minor factor in determining the subsurface structure. The ratio of potential versus energizing current is a function of (a) the spacial relationship and spacing of the energizing and potential electrodes, and (b) properties of the subsurface. Based on this discovery, I have been able to evolve a combined field technique which is decidedly advantageous in determining the subsurface structure because the near-surface effects may be evaluated or eliminated.

According to this invention a primary variable depth electrical survey is conducted, with a progressively changing distance between the energizing electrodes, and a series of measurements of an electrical variable are obtained which are influenced by inhomogeneities at different relatively great depths in the region which is being explored and by relatively near-surface inhomogeneities at different positions in this region. Another electrical survey is conducted within the same region, either separately or concurrently with the primary survey, and a series of measurements of the electrical variable are obtained which are primarily indicative of relatively near-surface inhomogeneities at the different positions within the region. This other survey, which may be termed an auxiliary or corrective survey, is preferably a constant depth survey at a relatively shallow depth, in which the distance between the two energizing electrodes is kept constant as the entire electrode system is moved to different positions, although, in some cases, this other survey may also be conducted as a variable depth survey, in which the spacing between the energizing electrodes, and consequently the depth of penetration, at the different positions, is materially less than at the corresponding positions in the first-mentioned primary survey.

It will be recognized that in areas of flat lying or nearly flat lying structures, such as commonly encountered in oil prospecting, the constant depth auxiliary survey will shown no significant structural changes (assuming no faults or other abrupt discontinuities are crossed by the line of measurements) since the same beds are being penetrated by the current, as the constant depth system is moved over the surface of the ground. It will further be recognized that in areas of steep dipping structures, the depth of penetration of the lesser-depth auxiliary survey may be made to follow the dip of the near-surface beds by varying the spacing of the electrodes as the system is moved over the ground. Such measurements are termed "constant stratigraphic depth" to differentiate them from the "constant depth" measurements. The constant stratigraphic depth measurements are of value when working through inconformities, the upper or outcropping beds of which have a known dip and strike.

Another alternative method which may be employed in conducting the auxiliary survey is to take measurements adjacent an energizing electrode as the latter is moved to different positions in the region being surveyed, while the other energizing electrode is spaced therefrom by a distance many times greater than the largest electrode spacing used in the primary variable depth survey, so that the relative changes in electrode spacing are quite small, and the readings obtained at the different positions of the moving energizing electrode are influenced primarily by changes in the near-surface effects at these different positions. If desired, when employing current of radio frequency, the distant electrode in this latter procedure may be replaced by an open-ended radiator vertically above the moving energizing electrode.

The measurements obtained in the primary variable depth survey may thus be corrected for the effects due to relatively near-surface inhomogeneities, as determined by the auxiliary survey, so that a corrected series of values indicative of the relatively deep-lying structural inhomogeneities at different depths in the region may be obtained.

Variations in the measurements obtained at the different electrode positions in the primary variable depth survey are due to the combined effects of vertical variations (inhomogeneities at the different depths of penetration of the current flow at the different electrode spacings) and lateral variations (inhomogeneities in the surface and near-surface conditions at the different positions of the path of current flow at the different electrode positions), while variations in the measurements obtained at the different electrode positions in the auxiliary survey are chiefly due to the lateral variations. It will be seen, therefore, that by proper interpretative methods, the relationship between these two series of measurements may be utilized to obtain indications of the inhomogeneities at different depths in the region covered by the primary and auxiliary surveys.

For practical purposes, I have found that a sufficiently accurate interpretation for this purpose can generally be obtained by simply determining the mathematical differences between the measurements obtained at corresponding electrode positions in the two surveys. A preferred procedure consists in plotting curves representing the measurements obtained at corresponding electrode positions in the two surveys, measuring the distances between these two curves at the different positions, and then plotting there differences with reference to a suitable base line to obtain a corrected curve whose flexures are indicative of the inhomogeneities at different depth of penetration corresponding to the respective electrode positions in the primary survey. Thus, the corrected values may be determined either by calculation or by graphic methods, by simply subtracting one set of measured values (or calculated values of an electrical property derived therefrom) from the other, and it is immaterial which of the sets of values is subtracted from the other, since the values thus obtained will be the same in both cases, but opposite in sign. The same arbitrary procedure should be followed, however, for all measurements at any station about which, or with reference to which, a combined electrical survey is conducted in accordance with the procedure herein outlined. Furthermore, for the purpose of facilitating comparison or correlation between the depth curves obtained at different stations, it is generally preferable to follow the same procedure at all stations within a region subjected to stratigraphic investigation, not only with respect to field technique and procedure, but also in the methods of calculating or plotting the results. The successive positions occupied by the moving electrodes are the same in both the primary and auxiliary surveys, which makes it possible to obtain an exact comparison of the conditions existing at the various points in each survey.

Prior investigators have neglected the effects of the lateral variations, on the assumption that they are of minor importance and do not mask the vertical variations. On the contrary, I have found that the near-surface effects, (which are predominant in any type of lateral variation study), are usually the predominant effects in any measurement made at the surface of the earth. Unless these effects are very carefully segregated and eliminated from the total measurements, they will influence and oftentimes mask the deeper-lying structural effects. Extensive studies extending over a period of years have conclusively shown that accurate sub-surface determinations cannot be made unless the lateral near-surface effects are eliminated from the series of measurements. It is the chief purpose of the invention to provide an effective means for segregating these two effects.

The distance between the potential electrodes and an adjacent energizing electrode is preferably kept constant as this electrode configuration is moved over the surface of the earth, and this spacing is the same in both types of surveys, which simplifies the work of laying out the survey points and minimizes the possibility of error, in addition to reducing the work of calculation.

Referring particularly to Fig. 3, I have shown energizing electrodes $I_1$ and $I_2$ connected to the surface of the earth (represented by the line S—S) and to a source of power 1 through insulated conductors 2 and 3. This source indicated diagrammatically at 1 may be of any suitable type, for example, a battery or other source of direct current, and will be understood herein to include any suitable means for controlling the current flow and indicating the magnitude thereof. Located adjacent the electrode $I_1$ I have shown a pair of potential electrodes $E_1$ and $E_2$ connected to the surface of the earth and to a potential measuring device 4. Adjacent electrode $I_2$ I have shown similar potential electrodes $E_3$ and $E_4$ connected to a potential measuring device 5. The measuring devices 4 and 5 may comprise any suitable potential measuring means such as are commonly employed in the art. While I prefer to use measuring devices such as hereinafter described, which measure directly the ratio of potential to the energizing current, simple potential and current measuring devices are shown here in order to simplify the description. It will be understood that this method is not limited to such measurements, but may be employed when measuring any other variable associated with the flow of electric current. At all positions of the electrodes in conducting a survey as hereinafter described, it will be understood that all of the electrodes are preferably located substantially upon a single straight line.

In conducting a primary variable depth survey in the region of a point indicated at 6 on the surface of the earth and at a depth from approximately 2,000 to 4,000 feet below said point, for example, the electrode $I_1$ may be placed at point 7 located 3,000 feet outwardly in one direction from the point 6, and the electrode $I_2$ may be placed at a point 8 located 3,000 feet outwardly on the other side of the point 6, so as to provide an initial total separation of 6,000 feet between these two electrodes. The electrodes $E_1$ and $E_3$ may be located at points 9 and 10 which are spaced a relatively short distance, for example, 500 feet, from the respective electrodes $I_1$ and $I_2$ and the electrodes $E_2$ and $E_4$ may be located at points 11 and 12 which are spaced a suitable distance, for example, 1,500 feet, from the respective electrodes $I_1$ and $I_2$ and in the same respective directions therefrom as the electrodes $E_1$ and $E_3$. Thus, a distance of 1,000 feet is provided between $E_1$ and $E_2$ and between $E_3$ and $E_4$. While I have shown the potential electrodes $E_1$ to $E_4$ as located inwardly of the respective adjacent energizing electrodes $I_1$ and $I_2$ (that is, between the latter electrodes), it will be understood that, if desired, the potential electrodes may be located outside of the respective energizing electrodes, or in any other positions adjacent the respective energizing electrodes to give a known electrode configuration which may be more advantageously suited for a particular set of local conditions. Whatever spacial arrangement of measuring electrodes and adjacent energizing electrode is used, this arrangement is preferably kept uniform throughout each of the two surveys over the same region.

An electric current is passed through the earth between the electrodes $I_1$ and $I_2$ and measurements are taken at 4 and 5. The line passing through the electrodes and the point 6 is preferably divided into suitable intervals, for example, 50-foot intervals, as indicated by the closely spaced dots on line S—S, these intervals preferably being equal to one another and even fractions of the electrode spacings employed, so that the same positions may be successively used for locating the different electrodes. After a set of measurements are made with the electrodes $I_1$ and $I_2$ at the points 7 and 8, these electrodes may be moved outwardly for a 50-foot interval to the points 13 and 14, respectively. The potential electrodes $E_1$ and $E_2$ may be simultaneously moved outwardly by the same interval to points 15 and 16, respectively, and the potential electrodes $E_3$ and $E_4$ adjacent the electrode $I_2$ may be moved outwardly by a similar interval to occupy the points 17 and 18. Current of the same or known value is then again passed through the earth between the electrodes $I_1$ and $I_2$ and measurements are again taken at 4 and 5 during passage of the current. This procedure is then repeated in conducting this primary survey, with the electrodes $I_1$, $E_1$, $E_2$ and the electrodes $I_2$, $E_3$, $E_4$ being moved progressively outward in opposite directions at equal intervals, until the electrodes $I_1$ and $I_2$ are located at points indicated at 19 and 20 which are 6,000 feet outwardly from the point 6, giving a total separation of 12,000 feet between these two electrodes. The interval between the electrodes $I_1$—$E_1$ and $E_1$—$E_2$ and between the electrodes $I_2$—$E_3$ and $E_3$—$E_4$ is preferably maintained constant as the current is successively passed between the points $I_1$ and $I_2$ at their different spacings. The successive readings obtained at 4 and 5 are influenced by inhomogeneities at different depths between approximately 2,000 feet and approximately 4,000 feet, and also by relatively near-surface inhomogeneities at the different positions of the electrodes.

Referring now to Fig. 5, distances from the central point 6 are indicated horizontally and the values of an electrical variable, such as electrical potential or resistivity, obtained from the above survey, are indicated vertically. Curves indicated as $C_4$ and $C_5$ may now be plotted from the values of the electrical variable as indicated by the instruments 4 and 5 at the various positions of the electrode configuration, for example, at the respective positions of electrodes $I_1$ and $I_2$ with respect to central point 6. The curves may be plotted directly from the values of the electrical variable as indicated by the respective instruments or from corresponding values of some property, such as resistivity, obtained by suitable computation involving the indications of the instruments and the relative electrode separations and spacial relationship, depending on the conditions maintained during a survey. The curves shown are representative of actual data taken from a typical field survey. It will be seen that although these curves representing the data obtained in the primary survey should be indicative of the subsurface conditions in the general region below point 6, they are so different that it is practically impossible to correlate them. I have found, however, that by conducting an auxiliary survey over the region shown in Fig. 3 and preferably at a materially less depth than the variable depth survey above described, for example, at a constant depth of about 1,000 feet, a series of values indicative of variations in the near-surface effects at the different electrode positions may b obtained, which may be correlated with the values of the electrical variable obtained at the corresponding electrode positions in the primary survey, to obtain a corrected series of values indicative of deeper-lying inhomogeneities at the different depths.

Referring to Fig. 4, the region illustrated in Fig. 3 is again illustrated and the points shown in Fig. 3 are marked thereon. To conduct a constant depth auxiliary survey, at a depth of approximately 1,000 feet, over the portion of this region to the right of center point 6, the electrode $I_1$ is placed in contact with the earth at the center point 6 and electrode $I_2$ is again placed in contact with the earth at point 8. Potential electrodes $E_5$ and $E_6$ are again located at points 10 and 12 and are connected to a potential measuring device 21. Current, preferably of the same value as employed at the same position of the electrodes $I_2$, $E_3$, and $E_4$ in the variable depth survey, is passed through the earth between the electrodes $I_1$ and $I_2$ and a measurement is taken at the potential indicating instrument 21. Thereafter the electrodes $I_1$ and $I_2$ are moved to points 22 and 14 and potential electrodes $E_5$ and $E_6$ are moved to points 17 and 18, so as to shift the entire electrode configuration outwardly 50 feet along the line of survey, and this is repeated until the electrode $I_2$ occupies the point 20 and the electrode $I_1$ occupies the point 8. The spacing between the entire system of electrodes is preferably maintained constant for each of the positions of the electrodes $I_1$ and $I_2$ and the readings are taken on the potential indicating instrument 21 for each of these positions of the electrodes and during the flow of current therebetween.

A similar survey is then conducted over the region at the opposite side of the point 6 and may be begun with the electrode $I_1$ occupying the point 6 and the electrode $I_2$ occupying point 7, and the eelctrodes $E_5$ and $E_6$ occupying the points 9 and 11, respectively. The electrode system is then moved outwardly of the point 6 and the survey is conducted by passing the electric current through the earth successively between equally spaced pairs of points located at different positions substantially on said straight line until the electrodes $I_1$ and $I_2$ occupy the points 7 and 19, respectively. It will be seen that the two constant depth surveys thus conducted provide an auxiliary survey covering the entire area in which measurements were taken in the primary variable depth survey illustrated in Fig. 3, and that the potential electrodes $E_5$ and $E_6$ and energizing electrode $I_2$ are successively moved to the same positions, in the two constant depth surveys at the respective sides of the center point, as were occupied by the electrodes $E_1$, $E_2$, $I_1$, and $E_3$, $E_4$, $I_2$ in the primary survey.

Referring again to Fig. 5, the data taken from the readings of instrument 21 for the different positions of the electrodes $I_1$ and $I_2$ in the constant depth surveys described in connection with Fig. 4 are represented by the curves $C_{24}$ and $C_{25}$. The curve $C_{24}$ is representative of the near-surface conditions at different distances to the left of the central point 6 and the curve $C_{25}$ is representative of near-surface conditions to the right of the central point 6. Corrected curves $C_L$ and $C_R$ may now be obtained by subtracting curve $C_4$ from curve $C_{24}$, and curve $C_5$ from curve $C_{25}$, respectively. The curves $C_L$ and $C_R$ are indicative of electrical inhomogeneities at the different depths.

It will now be seen that the similarity between $C_L$ and $C_R$ is immediately apparent and proper correlation can be made between the two curves to determine the structural conditions existing on each side of the central station. If desired, in regions where the structure is relatively uniform in a lateral direction, the two curves may be correlated and then averaged together to obtain a composite curve which represents the true structural picture surrounding the station. This average curve, or the separate curves, may now be compared with similar curves for other stations and the general subsurface stratigraphy of the area determined in a manner well-known to the art. The matching, or correlation, of such curves is similar to the correlation of the well-known electrical logs for oil well stratigraphic correlations. In more complicated cases, the two curves should not be merely subtracted one from another, but corrections preferably should be made for the effective angle of current flow surrounding the energizing electrodes, lateral separation and spacial relationship of the electrodes, current density, penetration factors, and other effects important for deep investigations.

The effective depth of penetration may be determined, knowing the relationship between the energizing electrode separation, the type of energizing current, and the relative conductivities of the subsurface materials versus depth in the area. As a general rule, the depth of penetration varies from .25 to .4 of the separation between the energizing electrodes. The literature commonly refers to the depth of penetration as approximately one-third the separation between the two energizing electrodes.

It will be recognized that the above-described method of averaging the corrected curves is specially applicable to the multi-directional measurements described in my copending application Serial No. 12,640. In the case of the tri-directional measurements described therein, two curves will be obtained for each leg along which the electrodes are moved. These two curves may now be correlated to obtain a corrected curve for that leg. The corrected curves for the three legs may now be correlated and averaged for obtaining a final composite curve for the station, or as an alternative, the three curves may be used in determining the dip and strike of the station.

Referring to Fig. 6, an electrode arrangement is shown which may be used for concurrently conducting a variable depth primary survey and a constant depth auxiliary survey. With this arrangement four energizing electrodes may be used and the procedure employed may be a combination of the procedures described in relation to Figs. 3 and 4. Thus the electrodes $I_1$, $I_2$, $E_1$, $E_2$, $E_3$, and $E_4$ may occupy the same relative positions as shown in Fig. 3 and may be moved in the same manner. Two other energizing electrodes $I_3$ and $I_4$ are utilized for conducting the constant depth survey and are maintained a constant distance from the electrodes $I_1$ and $I_2$ respectively, which distance depends upon the depth of the constant depth survey. Thus, at the start of the combined survey, the electrodes $I_3$ and $I_4$ may both be located substantially midway between electrodes $I_1$ and $I_2$.

The current may be passed through the earth between $I_1$ and $I_2$ while measurements are taken at 4 and 5; current may then be passed through the earth between $I_2$ and $I_4$ while measurements are taken at 5; and current may then be passed between $I_1$ and $I_3$ while measurements are taken at 4, the necessary connections of the respective pairs of energizing electrodes to the current source 1 being effected by a switch 31. This procedure may be repeated for each position of the electrodes, as the electrode configurations $I_1$, $I_3$, $E_1$, $E_2$ and $I_2$, $I_4$, $E_3$, $E_4$ are successively moved outwardly equal intervals, to the left and right, respectively, along the line of survey, until the necessary data is obtained. The resulting data will be comparable to that obtained with the two separate surveys described in relation to Figs. 3 and 4.

An alternative procedure is illustrated in Fig. 7. With this arrangement two sets of readings are taken at each position of the energizing electrodes, one of which is influenced by subsurface conditions at a relatively great depth and also by conditions at a lesser depth so as to provide a primary survey, and the other of which is indicative of conditions at the lesser depth so as to provide an auxiliary or corrective survey. The pair of energizing electrodes $I_1$ and $I_2$ may, for example, be placed in the same position as shown in Fig. 3, that is, with the electrode $I_1$ located at point 7 and electrode $I_2$ located at point 8, while a third energizing electrode, designated as $I_0$, is located at the central point 6. The potential electrodes $E_1$, $E_2$, $E_3$, and $E_4$ may be located at the respective points 9, 11, 10, and 12, as in Fig. 3. An electric current from the source 1 is then passed through the earth between the pair of energizing electrodes $I_1$ and $I_2$ and measurements are taken at 4 and 5. The current is then passed through the earth between electrodes $I_0$ and $I_2$ and a measurement taken at 5, and then between $I_0$ and $I_1$ and a measurement taken at 4.

A switch is indicated generally at 31 for effecting the successive connection of the source of power 1 between the electrodes $I_1$ and $I_2$, $I_0$ and $I_2$, and $I_0$ and $I_1$. The electrodes $I_1$ and $I_2$ are then moved outwardly to occupy the points 13 and 14, and the electrodes $E_1$, $E_2$, $E_3$, $E_4$ may also be moved outwardly by the same distance so as to occupy the points 15, 16, 17, and 18, respectively. Similar readings are then taken at the new positions of the electrodes as the earth is successively energized between the electrodes $I_1$—$I_2$, $I_2$—$I_0$, and $I_0$—$I_1$. This procedure is repeated until the electrodes $I_1$ and $I_2$ occupy the points at 19 and 20 and the potential electrodes occupy corresponding points as described in connection with Fig. 3, the electrode $I_0$ being maintained at the center point 6. The data obtained from such a survey may be handled in a manner very similar to that shown in Fig. 5. Thus the auxiliary set of measurements taken at different positions during the flow of current successively between electrodes $I_0$—$I_2$ and $I_0$—$I_1$ may be used as corrections for the primary set of measurements taken during flow of current between electrodes $I_1$—$I_2$ at said different positions, to provide a corrected series of values of the electrical variable indicative of the inhomogeneities at different depths in the region. This may be accomplished by simple subtracting the readings obtained at the different positions or, in more complicated cases, by plotting and correlating suitable curves and making the subtractions from the curves as shown in Fig. 5.

A somewhat modified form of procedure may be practiced with the apparatus shown in Fig. 8 in which the electrodes $I_0$, $I_1$, and $I_2$ are located at points 6, 7, and 8 and are adapted to be connected to the power supply 1 through the switch 31. The earth may be successively energized between the electrodes $I_1$ and $I_2$, $I_2$ and $I_0$, and $I_1$ by manipulating the switch 31 as described in relation to Fig. 7. Potential electrodes $E_1$ and $E_2$ may be located adjacent the respective energizing electrodes $I_1$ and $I_2$, and preferably at a distance therefrom which is relatively small as compared with the distance between the energizing electrodes, for example, at the points 9 and 10, respectively. A third potential electrode $E_0$ may be located adjacent the electrode $I_0$ at a point designated at 34 which may be 300 feet or more, for example, from electrode $I_0$. For symmetry of condition, the electrode $E_0$ may be located on a line passing through the center point 6 and at a right angle to the line of survey. Measurements are then taken between $E_1$ and $E_1$ when current is flowing between $I_1$ and $I_2$, between $E_0$ and $E_1$ when current is flowing between $I_0$ and $I_1$, and between $E_0$ and $E_2$ when current is flowing between $I_0$ and $I_2$. A suitable potential measuring device is shown at 33 and may be successively connected by a switch indicated generally at 32, which is comparable to switch 31, between the electrodes $E_1$ and $E_2$, $E_0$ and $E_1$, and $E_0$ and $E_2$. The respective electrodes $I_1$ and $E_1$ and $I_2$ and $E_2$ will then be moved outwardly to different positions until the electrodes $I_1$ and $I_2$ are respectively positioned at 19 and 20 and the three sets of readings may be taken for each position of electrodes $I_1$ and $I_2$. The data obtained when measuring between electrodes $E_0$ and $E_1$, and $E_0$ and $E_2$ for each position of the electrodes $I_1$ and $I_2$ may then be averaged together to provide an auxiliary set of values which may be used to correct the primary measurements taken between the electrodes $E_1$ and $E_2$ at the same positions of the electrodes $I_1$ and $I_2$. The electrodes $E_1$ and $E_2$ may be moved so as to maintain constant spacing thereof from electrodes $I_1$ and $I_2$ respectively, or may be moved so as to maintain a constant ratio between the distance $E_1$—$E_2$ and the distance $I_1$—$I_2$.

An alterative method may be practiced with the apparatus shown in Fig. 8 by taking measurements between the electrodes $E_1$ and $E_2$ only, while energizing the earth between electrodes $I_1$ and $I_2$, $I_0$ and $I_2$, and $I_0$ and $I_1$. The electrodes may be moved in a manner similar to that shown in Fig. 8 and the resulting data may be handled in a comparable manner.

It will be evident from the above-described embodiments of the process that the primary and auxiliary surveys over a certain area, in accordance with this invention, may be conducted concurrently, that is, with one series of movements of the electrodes while taking both the primary and auxiliary measurements at each successive position of the electrodes, or may be conducted separately, that is, by first moving the electrodes to the different positions and taking one series of measurements and then moving the electrodes successively to the proper corresponding positions and taking the other series of measurements. It will therefore be understood that references herein, and in the appended claims, to conducting one survey or obtaining one series of measurements and conducting the other survey or obtaining the other series of measurements, and other expressions of a similar nature, are intended to include both of these alternative procedures.

In any of the above-described procedures in which two energizing electrodes are described as moved relative to one another, one of the energizing electrodes may, alternatively, remain fixed and the other electrode may be moved to different positions on the earth's surface. Measurements may then be taken between electrodes adjacent the energizing electrode which is moved, or between electrodes located adjacent the two energizing electrodes.

The method of this invention is not limited to the use of direct currents for energizing the ground but may also be practiced with alternating currents of either high or low frequency, or with direct or alternating current impulses. When alternating current is used I have found that relatively low frequencies are usually more satisfactory for deep structure investigations. Examples of suitable impulses may be found in my issued Patent No. 2,015,401. However, in order to facilitate the interpretation and correlation of results, I prefer to employ the same type of energizing current in conducting the primary and auxiliary surveys at any particular station and, in general, throughout surveys at different stations included in a comprehensive stratigraphic investigation of a certain region.

It will be understood that the prime function of the measurements made at the surface of the earth is to determine the subsurface distribution of the energizing current. For purposes of illustration, the making of potential or resistivity measurements has been described in connection with the use of direct current for energizing the ground. If desired, magnetometric measurements may be made to determine the subsurface distribution. If alternating current is used, then electromagnetic and/or potential measurements may be employed. If pulse energization is employed, then the methods described in my issued Patent No. 2,015,401 may be used.

The moving energizing electrodes, as well as the moving potential electrodes, may be of the mobile type which are capable of being moved or of movement over the surface of the earth while maintaining electrical contact therewith, as described in my copending application Serial No. 112,747, filed November 25, 1936. Thus one or more of the electrodes in any of the above-described procedures may be a suitably motivated vehicle, such as a tractor provided with ground-engaging tread members. Another type of mobile electrode may be provided, for example, by equipping one or more of the operators with contact elements on each foot. The contact elements on both feet of an operator would then be connected together and to a conductor which preferably is employed in the measuring circuit. Contact would thus be maintained with the surface of the earth at all times during movement of the operator, through the elements carried on his feet, since at least one foot would always be in contact with the earth. Such an arrangement is described and claimed in my copending application Serial No. 278,806, filed June 13, 1939.

Although I have described procedures in which the spacing between any energizing electrode and its adjacent potential electrode or electrode system is maintained constant throughout a variable depth survey, it is within the scope of this invention to utilize procedures in which the spacing between said electrodes is different for different separations or positions of the energizing electrodes. This may also apply to the spacing between the potential electrodes of any pair between which measurements are taken. Thus procedures may be employed which utilize electrode arrangements comparable to that shown in Fig. 1 and a variable depth survey may be made in which the spacing between potential electrodes, and their adjacent energizing electrodes, are maintained at a constant ratio, and another survey may be conducted over the same region by maintaining a less separation of the energizing electrodes while maintaining the same spacing as in the first survey between each moving potential electrode and the adjacent energizing electrode. In any of these modifications of the invention it is important that the potential electrodes and their adjacent energizing electrode be located in corresponding positions for each of the two types of surveys over the same region.

It should be noted that although all the description has been directed to field procedures in which the energizing electrodes are first spaced at a minimum separation and then moved outwardly to progressively greater separations, the invention may be practiced with equal facility by first spacing the energizing electrodes at their greatest separation and progressively decreasing the separation to a minimum.

In any of the above-described procedures, the current in the energizing circuit may be adjusted so as to maintain a constant current flow at the successive electrode positions during a complete survey, or so as to vary the current flow at the successive electrode positions in a regular predetermined manner, for example, in proportion to the distance between the energizing electrodes, and the potential between potential electrodes may be measured during the flow of current at the successive electrode positions. Suitable current regulating and indicating means may be included in the energizing circuit for this purpose. Alternatively, the current may be regulated so as to provide a constant value of potential between potential electrodes of any pair at the successive electrode positions, and the different values of current may be measured by a suitable instrument in the energizing circuit. The last-mentioned alternative is not preferred when wide variations of current are encountered in an area, since the near-surface measurements and the deeper variable depth measurements should be made at substantially the same current value for corresponding positions of measurement in order to minimize the variations in apparent resistivity and/or potential distribution, or the like, caused by the electrolytic and polarization phenomena occurring in the region near the power electrodes. It is also preferable to maintain a uniform time of current flow, as well as a constant value of current flow, since the electrolytic and polarization effects are time-current phenomena which vary greatly with the nature of the electrolyte in the near-surface materials. Thus, I prefer to maintain the current flow between the energizing electrodes for the same length of time, such as a few seconds, before taking each measurement of the electrical variable at the different electrode positions throughout a survey, and it is important that this time be the same in the measurements taken at any particular position in the primary and auxiliary surveys.

According to a preferred procedure, I provide means for directly measuring the relation between the current in the energizing circuit and the potential between a pair of potential electrodes, while the current is maintained approximately constant. However, this system of measurement is not necessarily restricted to use with approximately constant current, but may also be employed with progressively varying current flow, in which case the current values in the primary and auxiliary surveys are preferably controlled so as to provide approximately the same current at any given position of measurement in the two surveys.

Such measurement must be obtained in an apparatus wherein the potential circuit is electrically and electrostatically isolated from the high voltage energizing circuit.

The apparatus may comprise, in general, a relaxation oscillator circuit including a gaseous discharge device for controlling the frequency of oscillation of the oscillatory circuit. A rectifier circuit is associated with the oscillatory circuit for producing a rectified potential which may be impressed across the potential electrodes in opposition to the potential across said electrodes created by the energizing current and a galvanometer may be included in this circuit for indicating when the rectified and created potentials are equal, or other equivalent means may be utilized to compare the value of the two potentials. The constants of the oscillatory circuit are preferably such that the discharge device is responsive to the value of the energizing current and is adapted to increase the frequency of oscillation of the oscillatory circuit with an increase in energizing current. The circuit constants are also preferably such as to increase the value of the rectified potential with an increase in the frequency of the oscillations. Thus the rectified potential will vary directly with the value of the energizing current, that is, will increase with increasing values of energizing current.

The relation of the energizing current to the potential created between two points on the earth's surface will remain substantially constant for various values of energizing current and this relation may be predicted in the case of a homogeneous medium. Deviation from this relation may be used as a means for determining the nature and characteristics of the subsurface. Thus the apparatus comprises means for adjusting the value of the rectified potential to make this potential equal to the created potential in order to obtain a balance between these potentials. The amount of adjustment required to balance these potentials may be used as an indication of the departure of the relation of the energizing current to the created potential from the relation that would be obtained in a homogeneous medium.

The adjustment may be obtained by varying the frequency of the oscillatory circuit through varying the response of the discharge device to the energizing current, or by varying the magnitude of the rectified potential without changing the frequency of oscillation of the oscillatory circuit.

A preferred form of apparatus for conducting such measurements is illustrated in Fig. 9. The energizing current from a source of current 41 passes through a conductor 41a and through a resistor 42, having a variable tap switch 43 for various ranges of current value and then to one energizing electrode through a conductor 41b. A conductor 41c connects the other side of the source of current 41 to the other energizing electrode. The potential drop across the resistor 42 is impressed across a calibrated potentiometer 44, the movable arm of which is connected to the control grid of a gaseous triode such as a grid glow tube or a grid-controlled mercury vapor rectifier 45. The grid-cathode circuit of the discharge device 45 comprises the potentiometer 44 in parallel with the resistor 42 and a bias source 44a connected between the resistor 44 and the cathode of the discharge device. Across the plate and cathode of the discharge device is a condenser 46. In series with the condenser is a source of power 47, switch 48, and resistor 49. It will be recognized that the tube circuit will produce periodic discharges, the frequency of which will be dependent upon the constants of the circuit and the potential impressed on the grid by the potentiometer 44. Across the resistor 49 is placed a transformer 50, in series with a blocking condenser 51. The varying voltage drop across the resistor is impressed on the primary winding of the transformer 50, while the secondary of the transformer is connected to a rectifier 52. A resistor 52a is shown connected across the output of the rectifier 52. A reversing potentiometer 57 is connected between a variable tap 52b on the resistor 52a and a terminal 59 which may be connected to one potential electrode. Another terminal 58, which may be connected to the other potential electrode, is connected to the other side of the resistor 52a through a series circuit including a galvanometer 53 and a circuit protecting resistor 54, provided with a shunt key 55. A reversing switch is provided at 56 to reverse the polarity of the rectified output. The reversing potentiometer 57 serves two purposes: (a) to neutralize any natural or galvanic potentials which may exist across the potential electrodes connected to terminals 58 and 59, and (b) to neutralize the rectified potential created across the resistor 52a by the oscillations of the tube at zero current flow in the energizing circuit, since it is not practical to have the tube circuit adjusted for zero oscillations at zero current flow. The tube is therefore adjusted for low frequency oscillations at zero energizing current flow, and the potential created by these low frequency oscillations is neutralized by the potentiometer 57 at the same time the earth potentials are neutralized.

The transformer 50 must have its primary and secondary windings well insulated from each other, in order to prevent leakage from the energizing circuit to the potential circuit. Good practice in electrical and electrostatic shielding must be employed.

By use of proper circuit constants, well known to the art, a substantially linear relationship may be obtained between the potential applied at the grid and the potential created across the terminals 58 and 59. With such linear relationship, the variations in current in the energizing circuit will introduce a compensating variation in the potential across 58 and 59. The system may be used therefore for measuring the relation of the potential drop across the potential electrodes connected to the earth to the value of the energizing current, by noting the position of the movable arm of the potentiometer 44 required to give a null reading of the galvanometer 53.

Adjustment of the potentiometer 44 will vary the value of the rectified potential by changing the frequency of oscillation of the device, while changing the position of the tap 52b will also change the value of the rectified potential applied between the terminals 58 and 59, but without changing the frequency of the device. It will be seen then that either the potentiometer 44 or the resistor 52a may be calibrated to give the value of the required relation. It will be appreciated that other forms of adjustment may be used to make the rectified potential equal to the created potential without departing from the spirit of this invention.

It will also be recognized that various other modifications of the circuit may be employed without departing from the spirit of the invention. For instance, a fixed potential may be applied across the grid of the gaseous triode, as by means of battery 63, while variations in the energizing current would be made to produce corresponding variations in the plate potential of the discharge device, by producing corresponding variations across a resistor 61, in series with the battery 47, as shown in Fig. 10, the circuit being otherwise the same as in Fig. 9.

A similar principle may be applied to a gridless "cold" type of gas discharge tube, as illustrated in Fig. 11, wherein 62 denotes such a tube, while the other connections are the same as described for the grid-controlled tube in Fig. 10. Other modifications will be apparent to those skilled in the art and need not be detailed herein.

I claim:

1. In a method of electrical exploration of the subsurface in which measurements are taken, during the passage of an electric current through the earth, of an electrical variable which is influenced by said current and by inhomogeneities in the subsurface, the steps which comprise: taking a primary series of measurements of said electrical variable at different positions within a region to be explored, while successively passing an electric current between differently spaced pairs of points within said region, in such manner that the measurements so obtained are influenced by inhomogeneities at different depths in said region and also by relatively near-surface inhomogeneities at said different positions; and taking an auxiliary series of measurements of said electrical variable at said different positions, while passing an electric current through the earth in said region in such manner that the measurements so obtained are primarily indicative of relatively near-surface inhomogeneities at said different positions; whereby the measurements of the primary series may be corrected for the effects due to relatively near-surface inhomogeneities at said different positions, as determined by the measurements of said auxiliary series, to provide a corrected series of values indicative of inhomogeneities at different depths in said region.

2. In a method of electrical exploration of the subsurface, the steps which comprise: taking a primary series of measurements of an electrical variable, while successively passing an electric current of substantially constant value between differently spaced pairs of points at the earth's surface within a region to be explored, in such manner that the measurements so obtained are influenced by inhomogeneities at different depths in said region and by near-surface inhomogeneities at different positions within said region; and taking an auxiliary series of measurements of said electrical variable, while passing an electric current of substantially the same constant value through the earth successively at said different positions, in such manner that the measurements so obtained are primarily indicative of relatively near-surface inhomogeneities at said different positions; whereby the primary series of measurements may be corrected for the effects due to relatively near-surface inhomogeneities, as indicated by said auxiliary series of measurements, to provide a corrected series of values indicative of inhomogeneities at different depths in said region.

3. In a method of electrical exploration of the subsurface, the steps as set forth in claim 1, in which the value of the current passed through the earth while taking each measurement in the auxiliary series is the same as when taking the measurement of said electrical variable at the same position in the primary series.

4. In a method of electrical exploration of the subsurface, the steps which comprise: successively passing an electric current between differently spaced pairs of points at the earth's surface within a region to be explored, while taking measurements of an electrical variable during the passage of said current, in such manner as to obtain a primary series of measurements which are influenced by inhomogeneities at different depths in said region and by near-surface inhomogeneities at different positions within said region; and separately passing an electric current through the earth successively at said different positions, while taking other measurements of said electrical variable during the passage of said current, in such manner as to obtain an auxiliary series of measurements which are primarily indicative of relatively near-surface inhomogeneities at said different positions, the current being passed through the earth for the same length of time before taking each measurement in both the primary and auxiliary series; whereby the primary series of measurements may be corrected for the effects due to relatively near-surface inhomogeneities, as indicated by said auxiliary series of measurements, to provide a corrected series of values indicative of inhomogeneities at different depths in said region.

5. In a method of electrical exploration of the subsurface, the steps which comprise: successively passing an electric current between differently spaced pairs of points at the earth's surface within a region to be explored, while taking measurements of an electrical variable during the passage of said current, in such manner as to obtain a primary series of measurements which are influenced by inhomogeneities at different depths in said region and by near-surface inhomogeneities at different positions within said region; and separately passing an electric current through the earth successively at said different positions, while taking other measurements of said electrical variable during the passage of said current, in such manner as to obtain an auxiliary series of measurements which are primarily indicative of relatively near-surface inhomogeneities at said different positions, each of said measurements of the auxiliary series being taken while passing the electric current between a pair of spaced points, one of which is located at the same position as one of the spaced points between which current is passed while taking one of the measurements in the primary series; whereby the primary series of measurements may be corrected for the effects due to relatively near-surface inhomogeneities, as indicated by said auxiliary series of measurements, to provide a corrected series of values indicative of inhomogeneities at different depths in said region.

6. In a method of electrical exploration of the subsurface, the steps as set forth in claim 1, in which the measurement of said electrical variable at each position in the auxiliary series is taken while passing the electric current between a pair of spaced points, one of which has the same location as one of the spaced points between which current is passed while taking the measurement of said electrical variable at the same position in the primary series.

7. In a method of electrical exploration of the subsurface, the steps which comprise: successively passing an electric current between differently spaced pairs of points at the earth's surface within a region to be explored, while taking measurements of an electrical variable during the passage of said current, in such manner as to obtain a primary series of measurements which are influenced by inhomogeneities at different depths in said region and by near-surface inhomogeneities at different positions within said region; and separately passing an electric current through the earth successively at said different positions between equally spaced pairs of points, while taking other measurements of said electrical variable during the passage of said current, in such manner as to obtain an auxiliary series of measurements which are primarily indicative of relatively near-surface inhomogeneities at said different positions, one of the points of each of said equally spaced pairs of points being located at the same position as one of the spaced points between which current is passed while taking one of the measurements in the primary series; whereby the primary series of measurements may be corrected for the effects due to relatively near-surface inhomogeneities, as indicated by said auxiliary series of measurements, to provide a corrected series of values indicative of inhomogeneities at different depths in said region.

8. In a method of electrical exploration of the subsurface, the steps which comprise: successively passing an electric current between differently spaced pairs of points at the earth's surface within a region to be explored, while taking measurements of an electrical variable during the passage of said current, in such manner as to obtain a primary series of measurements which are influenced by inhomogeneities at different depths in said region and by near-surface inhomogeneities at different positions within said region; and separately passing an electric current through the earth successively at said different positions, while taking other measurements of said electrical variable during the passage of said current, in such manner as to obtain an auxiliary series of measurements which are primarily indicative of relatively near-surface inhomogeneities at said different positions, each measurement in the auxiliary series being taken while passing the electric current between a pair of spaced points, one of which is located at the same position as one of the spaced points between which current is passed while taking a corresponding one of the measurements in the primary series, and the spacing between each pair of points between which current is passed while taking each such auxiliary measurement being less than the spacing between the pair of points between which current is passed while taking the corresponding primary measurement; whereby the primary series of measurements may be corrected for the effects due to relatively near-surface inhomogeneities, as indicated by said auxiliary series of measurements, to provide a corrected series of values indicative of inhomogeneities at different depths in said region.

9. In a method of electrical exploration of the subsurface involving the passage of an electric current through the earth between a pair of spaced electrodes and the measurement of the potential difference created by said current between a pair of spaced points on the earth's surface having a known spacial relationship with respect to said electrodes, the steps which comprise: moving at least one of said electrodes to different positions on the earth's surface to vary the spacing between said electrodes and thus vary the depth of penetration of the current flowing therebetween, and obtaining a primary series of measurements of said created potential difference at the different electrode spacings; and obtaining an auxiliary series of measurements of said created potential difference while one of said electrodes is located successively at said different positions and the spacing between said electrodes is less than the spacing therebetween for the corresponding positions of said one electrode during the primary series of measurements; whereby the primary series of measurements may be corrected for the effects due to relatively near-surface inhomogeneities, as determined by said auxiliary series of measurements, to provide a corrected series of values indicative of inhomogeneities at different depths in said region.

10. In a method of electrical exploration of the subsurface, the steps which comprise: conducting a primary electrical survey within a region to be explored, by successively passing an electric current through the earth between differently spaced pairs of points on the earth's surface, while taking measurements of an electrical variable between electrodes of a pair of electrodes located successively at different positions and adjacent one of said points, and also taking measurements between electrodes of another pair of electrodes located successively at different positions and adjacent the other of said points, to obtain a series of measurements which are influenced by inhomogeneities at different depths in said region and by near-surface inhomogeneities at said different positions within said region; and conducting an auxiliary electrical survey within said region, by passing an electric current through the earth successively between equally spaced pairs of points, while taking measurements, during passage of said current, of said electrical variable between electrodes located successively in the same different positions occupied by the respective pairs of electrodes during said primary survey, to obtain another series of measurements which are primarily indicative of relatively near-surface inhomogeneities at said different positions; whereby the measurements obtained in said primary survey may be corrected for the effects due to said near-surface inhomogeneities, as determined by said auxiliary survey, to provide a corrected series of values of said electrical variable indicative of inhomogeneities at different depths in said region.

11. In a method of electrical exploration of the subsurface, the steps which comprise: conducting a primary electrical survey within a region to be explored, by successively passing an electric current through the earth between differently spaced pairs of points on the earth's surface located substantially on a single straight line, while taking measurements of an electrical variable between a pair of electrodes located successively at different positions and adjacent one of said points, to obtain a series of measurements which are influenced by inhomogeneities at different depths in said region and by near-surface inhomogeneities at said different positions within said region; and conducting an auxiliary electrical survey within said region, by passing an electric current through the earth successively between equally spaced pairs of points located at different positions substantially on said straight line, while taking measurements, during passage of said current, of said electrical variable between electrodes located successively in the same different positions occupied by the electrodes during said primary survey to obtain another series of measurements which are primarily indicative of relatively near-surface inhomogeneities at said different positions of the electrodes; whereby the measurements obtained in said primary survey may be corrected for the effects due to said near-surface inhomogeneities, as determined by said auxiliary survey, to provide a corrected series of values of said electrical variable indicative of inhomogeneities at different depths in said region.

12. In a method of electrical exploration of the subsurface, the steps which comprise: successively passing an electric current through the earth between differently spaced points on the earth's surface within a region to be explored and located substantially on a single straight line, while taking measurements of an electrical variable successively at different positions during the passage of said current, in such manner as to obtain a primary series of measurements which are influenced by inhomogeneities at different depths in said region and by near-surface inhomogeneities at said different positions within said region; and passing an electric current through the earth successively between equally spaced pairs of points located at different positions substantially on said straight line, while taking other measurements, during the passage of said current of said electrical variable at the same different positions as the measurements in said primary series, in such manner as to obtain an auxiliary series of measurements which are primarily indicative of relatively near-surface inhomogeneities at said different positions of measurement; whereby the primary series of measurements may be corrected for the effects due to said near-surface inhomogeneities, as indicated by said auxiliary series of measurements, to provide a corrected series of values of said electrical variable indicative of inhomogeneities at different depths in said region.

13. In a method of electrical exploration of the subsurface, the steps which comprise: successively passing an electric current through the earth between a pair of spaced points on the earth's surface, and between each of said points and a third point on the earth's surface located between said first-named points and substantially on a straight line passing through said first-named points, while taking measurements adjacent each point of said pair of points of the value of an electrical variable during the flow of said current; and repeating the steps of passing said current successively between said points as the points of said pair of points are moved relative to one another, and to said third point, to different positions substantially along said straight line to vary the distance between each of said points, and of taking said measurements adjacent each point of said pair of points at said different positions; whereby measurements taken adjacent each point of said pair of points at said different positions during the flow of said current between said pair of points may be corrected for effects due to relatively near-surface inhomogeneities as indicated by measurements taken adjacent each point of said pair of points at said different positions during the flow of said current successively between each point of said pair and said third point, to provide a corrected series of values of said electrical variable indicative of inhomogeneities at different depths in said region.

14. In a method of electrical exploration of the subsurface, the steps which comprise: successively passing an electric current through the earth between a pair of spaced points on the earth's surface, and between each of said points and a third point on the earth's surface located between said first-named points and substantially on a straight line passing through said first-named points, while taking measurements, between an electrode located adjacent one point of said pair of points and another electrode located adjacent the other point of said pair of points, of the value of an electrical variable during the flow of said current; and repeating the steps of passing said current successively between said points as the points of said pair of points are moved relative to one another and to said third point to different positions substantially along said straight line to vary the distance between each of said points, and of taking said measurements at said different positions; whereby measurements taken during flow of said current between said pair of points at said different positions may be corrected for effects due to relatively near-surface inhomogeneities as determined by measurements taken at said different positions during the flow of said current successively between each point of said pair and said third point, to provide a corrected series of values of said electrical variable indicative of inhomogeneities at different depths in said region.

15. In a method of electrical exploration of the subsurface, the steps which comprise: successively passing an electric current through the earth between a pair of spaced points on the earth's surface, and between each of said points and a third point on the earth's surface located between said first-named points and substantially on a straight line passing through said first-named points, while taking measurements of an electrical variable between an electrode located adjacent one point of said pair of points and another electrode located adjacent the other point of said pair of points during flow of current between said pair of points, and between each of said electrodes and a third electrode located adjacent said third point during flow of current between the respective points of said pair and said third point, of the value of an electrical variable; and repeating the steps of passing said current between said points as the points of said pair of points are moved relative to one another and to said third point to different positions substantially along said straight line to vary the distance between each of said points, and of taking said measurements at said different positions; whereby measurements taken during flow of said current between said pair of points at said different positions may be corrected for the effects due to relatively near-surface inhomogeneities as determined by measurements taken at said different positions during the flow of said current successively between each point of said pair and said third point, to provide a corrected series of values of said electrical variable indicative of inhomogeneities at different depths in said region.

16. An apparatus for determining the relation of an energizing current to the potential created between two spaced points on the earth's surface by said current, which comprises: an oscillatory circuit including a gaseous discharge device for controlling the frequency of oscillation of said circuit, said discharge device being responsive to the value of said energizing current and adapted to increase said frequency of oscillation in response to an increase in said energizing current; rectifier means associated with said circuit for producing a rectified potential which varies directly with said frequency of oscillation; means for adjusting the value of said rectified potential, whereby said rectified potential may be made equal to said created potential; and indicating means for comparing the values of said two potentials.

17. In a method of electrical exploration of the subsurface, the steps which comprise: conducting a primary electrical survey within a region to be explored, by successively passing an electric current through the earth within said region between differently spaced pairs of points on the earth's surface, while taking measurements of a quantity indicative of the effects of subsurface variations upon the relation between said current and the potential created thereby between potential electrodes located successively at different positions within said region, to obtain a series of measurements which are influenced by inhomogeneities at different depths in said region and by near-surface inhomogeneities at said different positions; and conducting an auxiliary electrical survey within said region, by passing an electric current through the earth successively at said different positions, while taking measurements of a quantity indicative of the effects of subsurface variations upon the relation between said current and the potential created thereby between potential electrodes located successively in the same positions occupied by the electrodes during said primary survey, in such manner as to obtain another series of measurements which are primarily indicative of relatively near-surface inhomogeneities at said different positions; whereby the measurements obtained in said primary survey may be corrected for the effects due to said near-surface inhomogeneities, as determined by said auxiliary survey, to provide a corrected series of values of said electrical variable indicative of inhomogeneities at different depths in said region.

18. In a method of electrical exploration of the subsurface in which an electric current is passed successively between spaced energizing electrodes and measurements are taken involving the potential created between potential electrodes by said current, the steps which comprise: taking one series of such measurements with the potential electrodes located successively in different positions and with the energizing electrodes spaced a different distance from one another for each successive position of the potential electrodes; and taking another series of said measurements with said potential electrodes located successively in said different positions and with the energizing electrodes, for each successive position of the potential electrodes, spaced a less distance from one another than for the same position of the potential electrodes in taking said one series of measurements.

JOHN JAY JAKOSKY.

CERTIFICATE OF CORRECTION.

Patent No. 2,207,060.            July 9, 1940.

JOHN JAY JAKOSKY.

It is hereby certified that error appears in the printed specification of the above numbered patent requiring correction as follows: Page 2, second column, line 20, in the equation, for "2" read --4--; page 4, first column, line 62, for "there" read --these--; and second column, line 48, for "$l_1$ and $l_2$" read --$I_1$ and $I_2$--; line 61, for "$l_2$" read --$I_2$--; page 5, first column, line 62, for "$l_1$" read --$I_1$--; and second column, line 42, for "b" read --be--; page 6, first column, line 8, for "eelctrodes" read --electrodes--; page 7, first column, line 42, for "and $I_1$" read --and $I_0$ and $I_1$--; line 57, for "$E_1$ and $E_1$" read --$E_1$ and $E_2$--; page 9, second column, line 11, for "will" read --well--; and that the said Letters Patent should be read with this correction therein that the same may conform to the record of the case in the Patent Office.

Signed and sealed this 3rd day of September, A. D. 1940.

(Seal)                                          Henry Van Arsdale,
                                               Acting Commissioner of Patents.